(12) United States Patent
Muroi (10) Patent No.: US 10,418,600 B2
(45) Date of Patent: Sep. 17, 2019

(54) SECONDARY BATTERY PACKAGING MATERIAL AND SECONDARY BATTERY

(71) Applicant: TOPPAN PRINTING CO., LTD., Tokyo (JP)

(72) Inventor: Yuki Muroi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 51 days.

(21) Appl. No.: 15/681,838

(22) Filed: Aug. 21, 2017

(65) Prior Publication Data

US 2017/0346047 A1 Nov. 30, 2017

Related U.S. Application Data

(63) Continuation of application No. PCT/JP2016/054955, filed on Feb. 19, 2016.

(30) Foreign Application Priority Data

Feb. 23, 2015 (JP) ................. 2015-033268

(51) Int. Cl.
*H01M 2/02* (2006.01)
*B32B 15/08* (2006.01)

(52) U.S. Cl.
CPC ........... *H01M 2/0282* (2013.01); *B32B 15/08* (2013.01); *H01M 2/0287* (2013.01)

(58) Field of Classification Search
CPC .......................... H01M 2/0282; H01M 2/0287
See application file for complete search history.

(56) References Cited

U.S. PATENT DOCUMENTS

| | | | |
|---|---|---|---|
| 7,285,334 B1 | 10/2007 | Yamashita et al. | |
| 2004/0029001 A1* | 2/2004 | Yamazaki | H01M 2/021 |
| | | | 429/176 |
| 2014/0072864 A1* | 3/2014 | Suzuta | B32B 15/08 |
| | | | 429/176 |
| 2015/0380692 A1* | 12/2015 | Ojiri | B32B 7/02 |
| | | | 429/176 |

FOREIGN PATENT DOCUMENTS

| | | |
|---|---|---|
| EP | 2958161 A1 | 12/2015 |
| EP | 2958161 A1 | 12/2015 |
| EP | 3264487 A1 | 1/2018 |

(Continued)

OTHER PUBLICATIONS

International Search Report issued in International Patent Application No. PCT/JP2016/054955 dated May 24, 2016.

(Continued)

*Primary Examiner* — Cynthia K Walls
(74) *Attorney, Agent, or Firm* — Foley & Lardner LLP (57) ABSTRACT

The present invention provides a secondary battery packaging material including at least a metal foil layer, a second base material layer, and a heat-sealing resin layer laminated in this order on a surface of a first base material layer. The second base material layer is laminated on the metal foil layer directly or via an anti-corrosion treatment layer. The first base material layer is formed of a resin composite containing a thermosetting resin or a thermoplastic resin. The second base material layer is formed of a resin composite containing a thermosetting resin.

19 Claims, 4 Drawing Sheets

(56) References Cited

FOREIGN PATENT DOCUMENTS

| JP | 2010-261386 | | 9/1998 | | |
|---|---|---|---|---|---|
| JP | 2000-268787 | | 9/2000 | | |
| JP | 2000-334891 | | 12/2000 | | |
| JP | 2000-340186 | | 12/2000 | | |
| JP | 2000-340187 | A | 12/2000 | | |
| JP | 2001-222982 | | 8/2001 | | |
| JP | 2002-050325 | | 2/2002 | | |
| JP | 2002-298801 | | 10/2002 | | |
| JP | 2004-139749 | | 5/2004 | | |
| JP | 2011-142092 | | 7/2011 | | |
| JP | 2012-203983 | A | 10/2012 | | |
| JP | 2014-086135 | A | 5/2014 | | |
| JP | 201486135 | A | 5/2014 | | |
| JP | 2014-157798 | A | 8/2014 | | |
| JP | 2014157798 | A | 8/2014 | | |
| WO | WO 2012/153847 | * | 11/2012 | ............. | H01M 2/02 |
| WO | WO 2014/126235 | * | 8/2014 | ............. | H01M 2/02 |

OTHER PUBLICATIONS

Extended European Search Report dated Jan. 17, 2019 in corresponding application No. 16755386.6.
Third Party Observation dated Jun. 29 ,2018 in application No. 16755386.6.

* cited by examiner

SECONDARY BATTERY PACKAGING MATERIAL AND SECONDARY BATTERY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/054955, filed on Feb. 19, 2016, which is based upon and claims the benefit of priority of Japanese Patent Application No. 2015-033268, filed on Feb. 23, 2015, the entireties of which are hereby incorporated by reference.

TECHNICAL FIELD

The present invention relates to a secondary battery packaging material and a secondary battery.

BACKGROUND

In recent years, secondary batteries which are extremely thin and small have been under active development as power storage devices for use in personal computers, or mobile terminals, such as mobile phones, or for use in video cameras, satellites, vehicles, and other devices. As packaging materials used for such batteries, attention is being given to laminated packaging materials formed of a multi-layer film (e.g. packaging materials having a laminate configuration of base material layer/first adhesive layer/metal foil layer/second adhesive layer/heat-sealing resin layer). Laminated packaging materials formed of a multi-layer film are superior to conventional metal cans used as containers for battery elements, in that the materials have light weight and high heat dissipation, and allow for free selection of shape.

Secondary batteries are manufactured, for example, by forming a recess, using cold molding, on a part of a secondary battery packaging material formed of a multi-layer film, accommodating battery contents (positive electrode, separator, negative electrode, electrolyte solution, and other elements) in the recess, folding back the remaining part of the packaging material where the recess is not formed, and hermetically heat-sealing the edge portions, with the electrode terminals extending from the positive and negative electrodes sandwiched between the edge portions (hereinafter, such a battery may also be referred to as single-sided battery). In recent years, other types of secondary batteries have been manufactured, being provided with a packaging material in which a recess is formed on both sides thereof and bonded together to thereby efficiently accommodate more contents, for enhancement of energy density (hereinafter, such a battery may also be referred to as double-sided battery). To obtain high energy density with such secondary batteries, a deeper recess is required to be formed. However, a deep recess is prone to cause pin holes or breakage at the edge portions or corner portions of the recess where the degree of stretching is high in molding using a die.

To reduce the occurrence of pin holes or breakage in deeply molding a recess (in deep drawing), PTL 1, for example, describes protecting a metal foil by using a film, such as a stretched polyamide film or stretched polyester film, as a base material layer of the secondary battery packaging material.

PRIOR ART LITERATURE

Citation List

Patent Literature
PTL 1: JP 3567230 B

SUMMARY OF THE INVENTION

Technical Problem

It is true that the technique described in PTL 1 can provide moldability; however, an unstretched film, which is located on the inner side of the metal foil layer in manufacturing the battery, is fused and thinned when heat-sealed, and the battery elements, such as a positive electrode and a negative electrode, or electrode terminals, are prone to become electrically connected to the metal foil layer, causing a disadvantage of impairing insulation properties. In the configuration described in PTL 1, the packaging material may suffer from warpage after being formed. The warpage occurring after the packaging material being formed is a cause of impairing the performance or processability of the packaging material.

However, when the layer located on the inner side of the metal foil layer is too thick, moisture may penetrate into the battery, react with the battery contents or the like, and produce a substance, such as hydrofluoric acid, causing possible corrosion of the battery elements or the metal foil layer.

The present invention has been made in view of the above disadvantages, and has an object to provide a secondary battery packaging material that can reduce degradation in insulation properties while keeping moldability and moisture barrier properties, and can reduce warpage after being formed, and to provide a secondary battery using the secondary battery packaging material.

Solution to Problem

The present invention provides a secondary battery packaging material having at least a metal foil layer, a second base material layer, and a heat-sealing resin layer laminated in this order on a first surface of a first base material layer. In the secondary battery packaging material, the second base material layer is laminated directly on the metal foil layer or via only an anti-corrosion treatment layer, the first base material layer is formed of a resin composite containing a thermosetting resin or a thermoplastic resin, and the second base material layer is formed of a resin composite containing a thermosetting resin.

In the secondary battery packaging material, it is preferred that the metal foil layer is directly laminated on the first surface of the first base material layer. With this configuration of the secondary battery packaging material, the amount of moisture penetrating from the end portions of the packaging material can be further reduced, and the thickness of the overall packaging material can be further reduced, thereby making the secondary battery thinner and smaller.

In the secondary battery packaging material, it is preferred that the first base material layer has a thickness in a range of 5 µm or more to 30 µm or less, and the second base material layer has a thickness in a range of 5 µm or more to 30 µm or less. It is preferred that a difference in thickness between the first base material layer and the second base material layer is 15 µm or less.

In the secondary battery packaging material, it is preferred that the first base material layer and the second base material layer are formed of the same resin material. With this configuration of the secondary battery packaging material, the amount of warpage after molding can be further reduced.

In the secondary battery packaging material, it is preferred that the metal foil layer has a thickness in a range of 20 μm or more to 80 μm or less. When the thickness of the metal foil layer falls in that range, moldability and energy density are balanced better.

In the secondary battery packaging material, it is preferred that a coating layer that contains a lubricant made of fatty amide is formed on a second surface of the first base material layer or on a surface of the heat-sealing resin layer. With this configuration of the secondary battery packaging material includes, moldability can be further improved.

The present invention provides a secondary battery including battery elements and the secondary battery packaging material described above.

Advantageous Effects of the Invention

The present invention can provide a secondary battery packaging material and a secondary battery that can reduce degradation of insulation properties while keeping moldability and moisture barrier properties, and can reduce warpage after being formed.

BRIEF DESCRIPTION OF THE DRAWINGS

FIGS. 4A-4D are a set of diagrams illustrating perspective views of processing steps in producing a secondary battery using a secondary battery packaging material according to an embodiment of the present invention, in which FIG. 4A shows a secondary battery packaging material.

DESCRIPTION OF REPRESENTATIVE EMBODIMENTS

Some embodiments of the present invention will be described in detail below. These embodiments are intended to be representative of the present invention. It also should be noted that the present invention is not necessary limited to the following embodiments.

A packaging material according to the present invention includes a first base material layer, a metal foil layer, a second base material layer, and a heat-sealing resin layer as basic components. Specifically, the packaging material has a structure in which at least a metal foil layer, a second base material layer, and a heat-sealing resin layer are laminated in this order on a surface of a first base material layer.

[Secondary Battery Packaging Material 10]

Figure 1:
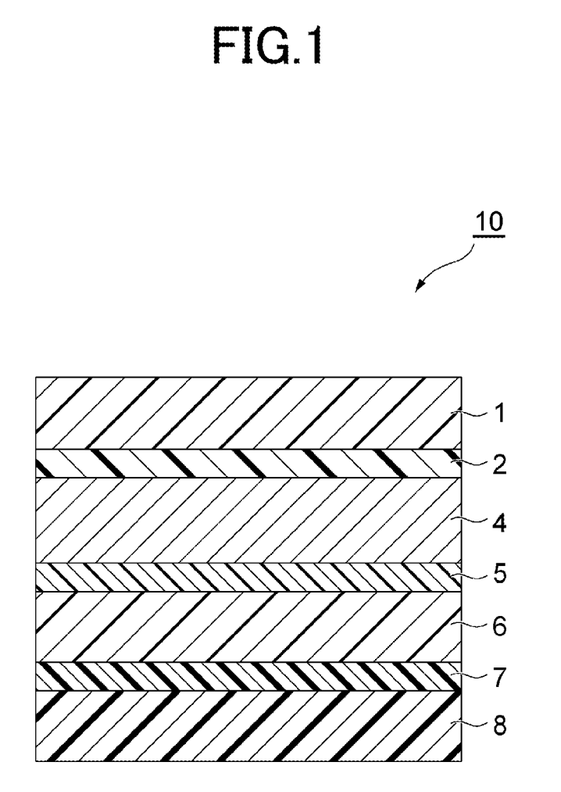
FIG. 1 is a schematic cross sectional view of a secondary battery packaging material according to an embodiment of the present invention.

First, a secondary battery packaging material 10 according to an embodiment of the present invention will be described (hereinafter, the packaging material may be simply referred to as packaging material 10). As shown in FIG. 1, the packaging material 10 includes a laminated structure in which a first base material layer 1, a first adhesive layer 2, a metal foil layer 4, an anti-corrosion treatment layer 5, a second base material layer 6, an adhesive resin layer 7, and a heat-sealing resin layer 8 are laminated in this order. The packaging material 10 is produced, for example, by forming the anti-corrosion treatment layer 5 on a surface of the metal foil, bonding the first base material to the other surface of the metal foil via a first adhesive, forming the second base material layer 6 on the anti-corrosion treatment layer 5, and forming the heat-sealing resin layer 8 on the second base material layer 6 via an adhesive resin. If the second base material layer 6 is formed of a resin composite containing a specific thermosetting resin, described later, which can impart anti-corrosion performance to the packaging material 10, the packaging material 10 does not necessarily have to include the anti-corrosion treatment layer 5.

(First Base Material Layer 1)

The first base material layer 1 plays a role of imparting heat resistance to the packaging material in a pressure/heat sealing process (Step S3 described later) in the manufacture of the battery, and reducing the occurrence of pin holes that could happen during processing or distribution. The first base material layer 1 also plays a role of preventing the metal foil layer 4 from being broken in an embossing process (Step S2 described later), or preventing the metal foil layer 4 from contacting other metals, to thereby assure insulation properties.

In producing the packaging material 10, a first base material is bonded to a surface of a metal foil via a first adhesive, described later. The first base material serves as the first base material layer 1, the first adhesive serves as the first adhesive layer 2, and the metal foil serves as the metal foil layer 4. In bonding the first base material, aging (curing) processing may be performed at a temperature in the range of ambient temperature to 100° C. for accelerating adhesion. Aging time is 3 to 10 days, for example.

In producing the packaging material 10, the first base material is served by a resin film containing a thermosetting resin or a thermoplastic resin. The thermosetting resin or the thermoplastic resin contained in the resin film includes, for example, a polyester resin, a polyurethane resin, a polyamide resin, a polyimide resin, a fluorine resin, a polyvinylidene chloride resin, and an acrylic resin. These resins for configuring the resin film may be used singly or in combination of two or more.

The polyimide resin includes a polyimide resin, a polyamide-imide resin, or a polyether-imide resin. The fluorine resin includes polytetrafluoroethylene, polychlorotrifluoroethylene, polyvinylidene fluoride, polyvinyl fluoride, a perfluoro-alkoxyfluoro resin, a tetrafluoroethylene-hexafluoropropylene copolymer, an ethylene-tetrafluoroethylene copolymer, or an ethylene-chloro-trifluoroethylene copolymer. If the first base material includes a thermosetting resin, then the resin film may further include a curing agent. The curing agent includes an isocyanate resin, an epoxy resin, or a melamine resin. If the first base material contains a thermosetting resin, then it can be said that the first base material layer 1 is a cured product of the first base material.

From the viewpoint such as moldability, heat resistance, thrust resistance, insulation properties, or chemical resistance, the resin film is preferably a polyester resin film or a polyamide resin film, and more preferably a biaxially-stretched polyester resin film or a biaxially stretched polyamide resin film.

The first base material may be a single film formed of one film or may be a composite film formed of two or more films bonded with a dry lamination adhesive.

In the resin film, an additive material, such as a fire retardant, a lubricant, an anti-blocking agent, an antioxidant, a light stabilizer, a tackifier, or an antistatic material, may be dispersed. A coating layer containing such additives (preferably, a lubricant) may be formed on a surface of the resin film (i.e. on the other surface of the first base material layer 1). The lubricant includes, for example, a fatty amide, such as oleic acid amide, erucic acid amide, stearic acid amide, behenic acid amide, ethylenebisoleamide, and ethylene-bis-erucic acid amide. Dispersing the lubricant inside the resin film, or forming the coating layer on a surface of the resin film, moldability of the packaging material 10 tends to be improved. The anti-blocking agent includes various fillers, such as silica. The additive may be used singly or in combination of two or more.

The first base material layer 1 has a thickness substantially equal to the resin film that is the first base material. From the viewpoint such as of thrust resistance, insulation properties, and embossing processability, the thickness of the first base material layer 1 is preferably in the range of 5 µm or more to 30 µm or less, and more preferably 8 µm or more to 25 µm or less. If the thickness of the first base material layer 1 is 5 µm or more, moldability, pin hole resistance, and insulation properties tend to be improved. If the thickness of the first base material layer 1 is 30 µm or less, increase in cost and decrease in energy density are minimized, and a balance with the second base material layer 6 is easily achieved.

To improve abrasion resistance, lubricity or the like, the first base material layer 1 can have asperity on its surface.

(First Adhesive Layer 2)

In the packaging material 10, the first adhesive layer 2 is formed between the first base material layer 1 and the metal foil layer 4. In other words, in the packaging material 10, the first base material layer 1 is formed on the other surface (the surface on a side opposite to the surface where the anti-corrosion treatment layer 5 is formed) of the metal foil layer 4 via the first adhesive layer 2. The first adhesive layer 2 bonds the first base material layer 1 to the metal foil layer 4. From the viewpoint of protecting the metal foil layer 4 from breakage using the first base material layer 1 in embossing, the first adhesive layer 2 preferably has conformability.

For the first adhesive that is a material forming the first adhesive layer 2, a dual-liquid cure adhesive can be used, which contains a base resin, such as polyester polyol, polyether polyol or acrylic polyol, and a curing agent, such as aromatic or aliphatic isocyanate. The first adhesive preferably has a NCO/OH molar ratio, that is, the ratio of a NCO group of the curing agent to an OH group of the base resin, in the range of 1 or more to 10 or less, and more preferably in the range of 2 or more to 5 or less. If the NCO/OH molar ratio is 1 or more, better adhesion can be obtained. If the NCO/OH molar ratio is 10 or less, excessive cross-linking reactions are prevented, which may lead to preventing disadvantages such as of making the first adhesive layer 2 brittle and hard, or of not obtaining moldability due to insufficient ductility.

The first adhesive can additionally contain a thermoplastic elastomer, a tackifier, a filler, a pigment, a dye, and the like.

From the viewpoint such as of adhesion strength, conformability, and processability, the thickness of the first adhesive layer 2 is preferably in the range of 0.5 µm or more to 10 µm or less, and more preferably 1 µm or more to 5 µm or less. The first adhesive layer 2 has a thickness substantially equal to the dry thickness of the first adhesive after being coated and dried.

(Metal Foil Layer 4)

The metal foil layer 4 plays a role of preventing moisture from penetrating into the battery (i.e., the metal foil layer 4 has moisture barrier properties). In the packaging material 10, the metal foil layer 4 is disposed between the first adhesive layer 2 and the second base material layer 6. The metal foil layer 4 has ductility for deep drawing.

In producing the packaging material, various metal foils, such as an aluminum foil or a stainless steel foil, can be used for the metal foil serving as the metal foil layer 4. From the viewpoint of weight (specific gravity), moisture resistance, processability, and cost, aluminum foil is preferred.

The aluminum foil for use as the metal foil layer 4 may be a known soft aluminum foil. From the viewpoint of pin hole resistance and ductility in molding, an aluminum foil containing iron is preferred. The content of iron in an aluminum foil (100 mass %) is preferably in the range of 0.1 mass % or more to 9.0 mass % or less, and more preferably 0.5 mass % or more to 2.0 mass % or less. If the content of iron is not less than the lower limit, pin hole resistance and ductility are further improved. If the content of iron is not more than the upper limit, flexibility is further improved.

The metal foil layer 4 has a thickness substantially equal to the metal foil. The thickness is preferably in the range of 20 µm or more to 80 µm or less, and more preferably 25 µm or more to 60 µm or less. If the thickness of the metal foil layer 4 is 20 µm or more, pin holes or breakage are less prone to occur in molding. If the thickness of the metal foil layer 4 is 80 µm or less, increase in cost or decrease in energy density is easily minimized with various performances being maintained.

(Anti-Corrosion Treatment Layer 5)

In the case of a lithium ion secondary battery, for example, the anti-corrosion treatment layer 5 plays a role of preventing corrosion on the surface of the metal foil layer 4 due to hydrofluoric acid produced by a reaction between the electrolyte solution and moisture. The anti-corrosion treatment layer 5 serves as an anchor layer between the metal foil layer 4 and the second base material layer 6. For example, the anti-corrosion treatment layer 5 is formed on a surface of the metal foil layer 4 by applying an anti-corrosion agent to the surface of the metal foil layer 4, followed by drying. A coating method of the anti-corrosion agent is not limited specifically. Various methods, such as gravure coating, reverse coating, roll coating, or bar coating, can be used.

For example, the anti-corrosion treatment layer 5 is formed through chromate treatment using an anti-corrosion agent containing chromate, phosphate, fluoride, and various thermosetting resins, or through ceria sol treatment using an anti-corrosion agent containing a rare earth oxide (e.g., ceric oxide), phosphate, and various thermosetting resins. The anti-corrosion treatment layer 5 is not limited to the layer formed by the above treatments as long as the layer plays the above roles. For example, the anti-corrosion treatment layer 5 may be formed by phosphate treatment, or boehmite treatment. The anti-corrosion treatment layer 5 may be a single layer or multiple layers. For example, the anti-corrosion treatment layer 5 may have a structure including two or more layers, in which a resin as an overcoating agent (overcoat layer) is applied to the layer that has been formed using the anti-corrosion agent.

The anti-corrosion treatment layer 5 has a thickness substantially equal to the dry thickness of the coating layer of the anti-corrosion agent (and the overcoat layer). From the viewpoint of anti-corrosion and anchoring, the thickness is preferably in the range of 5 nm or more to 1 μm or less, and more preferably 10 nm or more to 200 nm or less.

(Second Base Material Layer 6)

The second base material layer 6 plays a role of preventing the occurrence of breakage or pin holes in the metal foil layer 4 during embossing, and preventing the metal foil layer 4 from contacting the battery elements or the leads (metal terminals), to thereby easily obtain electrical insulation properties. Being provided with the first and second base material layers 1 and 6 on respective surfaces of the metal foil layer 4, warpage is reduced in molding the packaging material includes.

The second base material layer 6 is laminated on the metal foil layer 4 via the anti-corrosion treatment layer 5. If the packaging material 10 does not include the anti-corrosion treatment layer 5, the second base material layer 6 is directly laminated on the metal foil layer 4. In other words, the second base material layer 6 is formed on the metal foil layer 4 or the anti-corrosion treatment layer 5 without an adhesive layer therebetween. Thus, the thickness of the overall packaging material can be decreased, and the number of processing steps and manufacturing cost can be decreased more compared to the case of forming the second base material layer 6 via the adhesive layer. When the packaging material 10 does not include the adhesive layer, the amount of moisture penetrating from the end portions of the packaging material can be reduced. In this case, it is preferred that the second base material layer 6 is formed by applying the second base material to the metal foil layer 4 or the anti-corrosion treatment layer 5.

The second base material is a resin composite containing a thermosetting resin. It can be said that the second base material layer 6 is a cured product of the second base material. The thermosetting resin is preferably at least one resin selected from a group consisting of a polyester resin, a polyurethane resin, a polyamide resin, a polyimide resin, a fluorine resin, a polyvinylidene chloride resin, and an acrylic resin. When the second base material layer 6 is formed of a resin composite containing a thermosetting resin, thickness reduction of the second base material layer 6 during heat sealing is minimized. Minimization of the thickness reduction can prevent contact between the metal foil layer 4 and the battery elements or the leads (metal terminals), and secure insulation properties. When the second base material layer 6 is formed of a resin composite containing a thermosetting resin, anti-corrosion properties and chemical resistance are likely to be imparted to the packaging material 10. When the second base material layer 6 has chemical resistance, the packaging material 10 is unlikely to be dissolved by the electrolyte solution or the like, thereby preventing lowering of strength or performances. The polyimide resin includes a polyimide resin, a polyamide-imide resin, and a polyether-imide resin. The fluorine resin includes polytetrafluoroethylene, polychlorotrifluoroethylene, polyvinylidene fluoride, polyvinyl fluoride, perfluoro-alkoxyfluoro resin, tetrafluoroethylene-hexafluoropropylene copolymer, ethylene-tetrafluoroethylene copolymer, and ethylene-chlorotrifluoroethylene copolymer. These resin materials may be singly or in combination of two or more.

The second base material (resin composite) preferably contains a curing agent together with the resin materials mentioned above. The curing agent includes an isocyanate resin, an epoxy resin, and a melamine resin. When the second base material contains a curing agent, adhesion of the cured second base material layer 6 to the anti-corrosion treatment layer 5 and the adhesive resin layer 7 can be improved, and the metal foil layer 4 can be more strongly protected during molding. Accordingly, moldability can be further improved. When the resin composite contains a curing agent, anti-corrosion is likely to be further improved. The resin material preferably has a functional group that can react with the curing agent. When the resin material has a functional group that can react with the curing agent, curing of the second base material is further advanced in the cross-linking reactions involving not only the curing agent but also the resin material, facilitating adjustment such as of melting point characteristics of the second base material layer 6. The functional group that can react with the curing agent includes an amino group, a carboxy group, a hydroxyl group, and a carbonyl group. By increasing the crosslink density of the second base material layer 6, better electrical insulation properties are likely to be obtained. In other words, when the resin composite contains a resin material and a curing agent and the resin material is cross-linked to the curing agent, better electrical insulation properties are likely to be obtained.

For example, the second base material is applied, as a solution, to the metal foil layer 4 or the anti-corrosion treatment layer 5, and heated or dried to serve as the second base material layer 6. If the second base material contains a curing agent and is further aged, the second base material is thereby cured to serve as the second base material layer 6. The second base material layer 6 preferably has a melting point higher than the heat-sealing resin layer 8 by 40° C. or more, and more preferably by 70° C. or more. When the packaging material including the second base material layer 6 with a melting point in the above range is heat-sealed, thickness reduction of the second base material layer 6 during heat sealing is further minimized. Thus, the metal foil layer 4 can be prevented from contacting the battery elements or the leads (metal terminals), and better insulation properties are secured. If the difference in melting point between the second base material layer 6 and the heat-sealing resin layer 8 is large, heat sealing performance and insulation properties are both easily satisfied, and the heat sealing temperature can be set in a wide temperature range. The melting point of the second base material layer 6 is preferably 200° C. or more, and more preferably 230° C. or more. When the melting point of the second base material layer 6 is 200° C. or more, the second base material layer 6 will not be excessively thinned in heat sealing, and the metal foil layer 4 is prevented from contacting the battery elements or the leads (metal terminals), thereby obtaining more reliable insulation properties. The upper limit of the melting point of the second base material layer 6 is not specifically limited. For example, the second base material layer 6 may have a melting point of about 500° C., or may not necessarily have a melting point. The difference in melting point between the second base material layer 6 and the heat-sealing resin layer 8 may be 100° C. or less. If the difference in melting point between the second base material layer 6 and the heat-sealing resin layer 8 is small, the processability of the second base material layer 6 tends to be improved. The melting point of the second base material layer 6 can be adjusted, for example, by controlling the number of cross-linking points with the amount of the functional group of the resin material, and the amount of addition of the curing agent. Therefore, the amount of the functional group of the resin material and the amount of added curing agent may be appropriately selected so that the melting point falls within the above range, taking into account the other characteristics, such as the protection effect, of the metal foil layer 4. By laminating the second base material layer 6, directly or via only the anti-corrosion treatment layer 5, on the metal foil layer 4, warpage in molding is minimized and insulation properties are further improved, while maintaining moldability and moisture barrier properties. In the present specification, the melting point refers to the peak-top temperature of heat absorption in melting a sample at the heating rate of 5° C./min. using a differential scanning calorimeter (DSC).

The second base material forming the second base material layer 6 is preferably a resin material that is the same as the first base material configuring the first base material layer 1. Specifically, for example, if the first base material is a polyester resin film, the second base material is preferably a polyester resin. When the second base material is a resin material that is the same as the first base material, the amount of warpage of the packaging material after being formed is easily minimized.

The second base material layer 6 has a thickness substantially equal to the dry thickness of the coating layer of the second base material. From the viewpoint such as of moldability, insulation properties and moisture barrier properties, the thickness is preferably in the range of 5 µm or more to 30 µm or less, more preferably 8 µm or more to 25 µm or less, even more preferably 8 µm or more to 20 µm or less, and still more preferably 8 µm or more to 15 µm or less. If the thickness of the second base material layer 6 is 5 µm or more, moldability, pin hole resistance, and insulation properties are likely to be improved. If the thickness of the second base material layer 6 is 30 µm or less, the amount of moisture penetrating from the end portions in the manufacture of the battery can be reduced, and moisture barrier properties are likely to be improved.

The difference in thickness between the first and second base material layers 1 and 6 is preferably 15 µm or less, and more preferably 10 µm or less. If the difference in thickness between the first and second base material layers 1 and 6 is 15 µm or less, warpage in molding is easily reduced.

(Adhesive Resin Layer 7)

The adhesive resin layer 7 bonds the heat-sealing resin layer 8 to the second base material layer 6. The configurations of the second base material layer 6, the adhesive resin layer 7, and the heat-sealing resin layer 8, including the adhesive resin configuring the adhesive resin layer 7, are roughly classified into a thermal laminate configuration and a dry laminate configuration.

In a thermal laminate configuration, an adhesive resin is introduced on the second base material layer 6 by extrusion lamination. The adhesive resin in the thermal laminate configuration is preferably a thermoplastic resin. The adhesive resin in the thermal laminate configuration includes, for example, a polyolefin resin, an elastomer resin, and an acid-modified polyolefin resin.

The polyolefin resin includes, for example, a low-, medium- or high-density polyethylene, an ethylene-α-olefin copolymer, polypropylene, and a propylene-α-olefin copolymer. The polyolefin resin in the form of a copolymer may be a block copolymer or a random copolymer.

The acid-modified polyolefin resin includes, for example, a resin in which a polyolefin resin mentioned above is modified by an unsaturated carboxylic acid or by a derivative thereof (acid-modified). The unsaturated carboxylic acid includes, for example, acrylic acid, methacrylic acid, maleic acid, fumaric acid, crotonic acid, and itaconic acid. The derivative of unsaturated carboxylic acid includes, for example, an anhydride, mono- or di-ester, an amide compound, and an imide compound of unsaturated carboxylic acid. The unsaturated carboxylic acid or a derivative thereof is preferably acrylic acid, methacrylic acid, maleic acid, or maleic anhydride, and more preferably maleic anhydride. The acid-modified polyolefin resin can be obtained by copolymerizing unsaturated carboxylic acid, a derivative thereof, other monomers, and the like. The copolymerization may be any one of block copolymerization, random copolymerization, and graft copolymerization. These unsaturated carboxylic acids and derivatives thereof may be used singly or in combination of two or more. Polyolefin resins and acid-modified polyolefin resins have good electrolyte solution resistance.

The elastomer resin includes, for example, a SEBS (styrene/ethylene/butylene/styrene) copolymer, a SBS (styrene/butadiene/styrene) copolymer, a SEPS (styrene/ethylene/propylene/styrene) copolymer, a SEP (styrene/ethylene/propylene) copolymer, and a SIS (styrene/isoprene/styrene) copolymer. When an elastomer resin and an acid-modified polyolefin resin mentioned above are combined for use as an adhesive resin, resistance against draw-whitening due to cracks caused by cold molding is likely to be improved, adhesion is likely to be improved by the improved wettability, film deposition properties are likely to be improved by the decreased anisotropy, and properties in relation to heat sealing strength or the likes are likely to be improved.

In a dry laminate configuration, the adhesive resin is introduced on (e.g. applied to) the second base material layer 6. The adhesive resin in the dry laminate configuration includes, for example, an acid-modified polyolefin resin. The acid-modified polyolefin resin includes the acid-modified polyolefin resins exemplified above in relation to the thermal laminate configuration.

The adhesive resin layer 7 has a thickness substantially equal to the dry thickness of the introduction layer of the adhesive resin. In the case of a thermal laminate configuration, the thickness of the adhesive resin layer 7 is preferably in the range of 8 µm or more to 30 µm or less, and more preferably 10 µm or more to 20 µm or less. If the thickness of the adhesive resin layer 7 is 8 µm or more, sufficient adhesion strength is easily obtained between the second base material layer 6 and the heat-sealing resin layer 8. If the thickness of the adhesive resin layer 7 is 30 µm or less, the amount of moisture penetrating from the end faces of the packaging material into the battery is easily reduced. In the case of a dry laminate configuration, the thickness of the adhesive resin layer 7 is preferably in the range of 1 µm or more to 5 µm or less. If the thickness of the adhesive resin layer 7 is 1 µm or more, the adhesion is improved between the second base material layer 6 and the heat-sealing resin layer 8, and sufficient lamination strength is easily obtained. If the thickness of the adhesive resin layer 7 is 5 µm or less, the occurrence of cracks on the film is easily reduced. When the film thickness of the adhesive resin layer 7 in a dry laminate configuration falls within the range of 1 µm or more to 5 µm or less, stronger adhesion is achieved between the heat-sealing resin layer 8 and the second base material layer 6.

(Heat-Sealing Resin Layer 8)

The heat-sealing resin layer 8 is formed on the second base material layer 6 via the adhesive resin layer 7. The heat-sealing resin layer 8 may be laminated by a dry lamination, sandwich lamination, or the like, or may be laminated by co-extrusion together with the adhesive resin layer 7. When the heat-sealing resin layer 8 is laminated on the adhesive resin layer 7, and two surface parts of the packaging material are brought to a position for the heat-sealing resin layer 8 to face itself for heat-sealing of the end portions of the packaging material at the fusing temperature (melting point) of the heat-sealing resin layer 8, battery contents can be sealed on the inside of the two surface parts of the packaging material. The heat-sealing resin layer 8 is formed of a heat sealing resin. The heat sealing resin includes a polyolefin resin. The polyolefin resin includes, for example, a low-, medium- or high-density polyethylene, and polypropylene. The polyolefin resin may be a copolymer, a block copolymer, or a random copolymer. The polyolefin resin may be a copolymer in which a polar monomer, such as acrylic acid or methacrylic acid, is copolymerized, or may be a resin in which a polymer, such as cross-linked polyolefin, is dispersed or copolymerized. These polyolefin resins may be used singly or in combination of two or more. The heat-sealing resin layer 8 may be formed of a heat sealing resin film. The heat sealing resin film forming the heat-sealing resin layer 8 may be a film mixed with a polyolefin resin mentioned above, and thus is preferably an unstretched polyolefin resin film, and more preferably an unstretched polypropylene film. The heat sealing resin film forming the heat-sealing resin layer 8 may be a single layer film or a multi-layer film.

The heat-sealing resin layer 8 may be formed of a heat sealing resin composite containing various additives, such as a lubricant, an anti-blocking agent, an antistatic agent, a nucleating agent, a pigment, and a dye, together with a heat sealing resin mentioned above. These additives may be used singly or in combination of two or more. A coating layer containing an additive mentioned above (preferably, a lubricant) may be formed on the heat-sealing resin layer 8 (the surface on a side opposite to the surface facing the metal foil layer 4). For the lubricant, the lubricants named in relation to the first base material layer can be used. When the heat-sealing resin layer 8 is formed of a heat sealing resin composite containing a lubricant, or when a coating layer containing a lubricant is applied to the heat-sealing resin layer 8, moldability of the packaging material 10 is likely to be improved.

The heat-sealing resin layer 8 has a thickness substantially equal to the resin film forming the heat-sealing resin layer 8. The thickness is preferably in the range of 20 μm or more to 90 μm or less. If the thickness of the heat-sealing resin layer 8 is 20 μm or more, sufficient lamination strength is easily obtained. If the thickness of the heat-sealing resin layer 8 is 90 μm or less, increase in the amount of permeating moisture is easily minimized.

[Secondary Battery Packaging Material 20]

Figure 2:
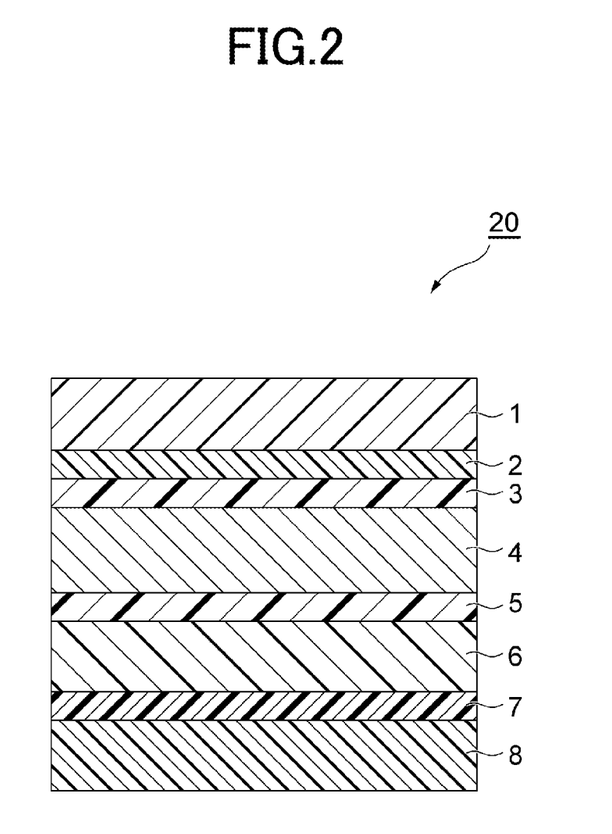
FIG. 2 is a schematic cross sectional view of a secondary battery packaging material according to another embodiment of the present invention.

The following description addresses a secondary battery packaging material 20 according to another embodiment of the present invention (hereinafter, the packaging material may be simply referred to as packaging material 20). As shown in FIG. 2, the packaging material 20 has a laminated structure in which a first base material layer 1, a first adhesive layer 2, an anti-corrosion treatment layer 3, a metal foil layer 4, an anti-corrosion treatment layer 5, a second base material layer 6, an adhesive resin layer 7, and a heat-sealing resin layer 8 are laminated in this order. The packaging material 20 is different from the packaging material 10 in that the anti-corrosion treatment layer 3 is further provided between the first adhesive layer 2 and the metal foil layer 4. Being provided with the anti-corrosion treatment layer 3, the packaging material 20 can prevent corrosion of the surface of the metal foil layer 4 on the first base material layer 1 side. The anti-corrosion treatment layer 3 can be formed by using an anti-corrosion agent and a method similar to those used for the anti-corrosion treatment layer 5 described in relation to the packaging material 10.

[Secondary Battery Packaging Material 30]

Figure 3:
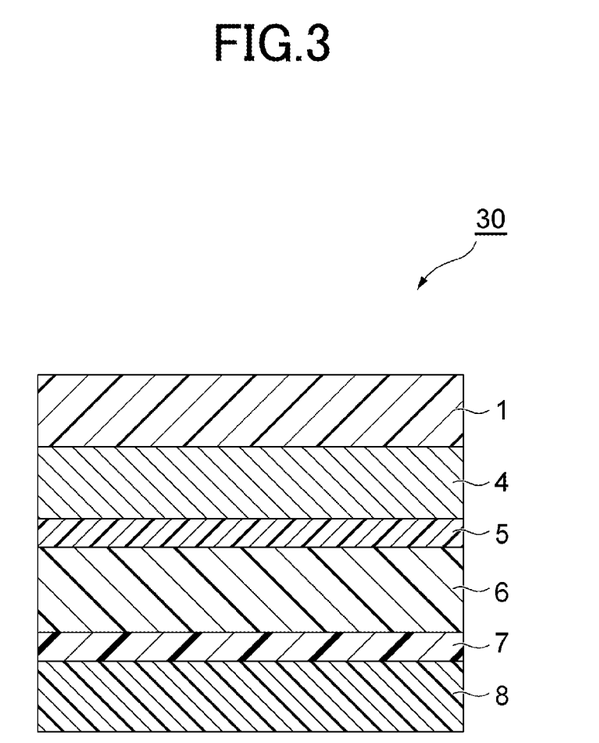
FIG. 3 is a schematic cross sectional view of a secondary battery packaging material according to another embodiment of the present invention.

The following description addresses a secondary battery packaging material 30 according to another embodiment of the present invention (hereinafter, the packaging material may be simply referred to as packaging material 30). As shown in FIG. 3, the packaging material 30 includes a laminated structure in which a first base material layer 1, a metal foil layer 4, an anti-corrosion treatment layer 5, a second base material layer 6, an adhesive resin layer 7, and a heat-sealing resin layer 8 are laminated in this order. The packaging material 30 is different from the packaging material 10 in that the first adhesive layer 2 is not included. In the packaging material 30, the metal foil layer 4 is directly laminated on a surface of the first base material layer 1. In other words, the first base material layer 1 is formed on the surface of the metal foil layer 4, where the anti-corrosion treatment layer 5 is not formed, without being interposed by an adhesive layer. Thus, the thickness of the overall packaging material is decreased, thereby providing a thinner and smaller secondary battery, with reduced number of processing steps and manufacturing cost compared to the case of forming the first base material layer 1 via the adhesive layer. In this case, the first base material layer 1 is preferably formed by applying the first base material to the metal foil layer 4. If the second base material layer 6 is formed of a resin composite containing a specific thermosetting resin mentioned above that can impart anti-corrosion properties, the packaging material 30 does not necessarily have to include the anti-corrosion treatment layer 5.

In producing the packaging material 30, the first base material is applied to the metal foil layer 4 in a manner similar to the application of the second base material to the anti-corrosion treatment layer 5 in the packaging material 10. In producing the packaging material 30, the first base material is a resin composite containing a thermosetting resin or a thermoplastic resin. It can be said that the first base material layer 1 is a cured product or solidified product of the first base material. The thermosetting resin or thermoplastic resin includes, for example, a polyester resin, a polyurethane resin, a polyamide resin, a polyimide resin, a fluorine resin, a polyvinylidene chloride resin, and an acrylic resin. More specifically, the materials named for the second base material can be used for the first base material in producing the packaging material 30. The first base material may additionally contain a curing agent, such as an isocyanate resin, a melamine resin, and an epoxy resin. The resin material used for the first base material layer 1 is preferably the same as one used for the second base material layer 6. When the resin material used for the first base material layer 1 is the same as that used for the second base material layer 6, warpage is easily reduced in the packaging material after being formed.

[Secondary Battery 60]

The following description addresses a secondary battery provided with the packaging material described above. The secondary battery of the present embodiment includes battery elements and the packaging material. Specifically, the secondary battery includes battery elements including electrodes, leads (metal terminals) extending from the respective electrodes, and a container accommodating the battery elements. The container is formed from the packaging material so that the heat-sealing resin layer 8 is on the inside. The container may be obtained by overlapping two packaging materials each other in alignment, so that the heat-sealing resin layers 8 are brought to face-to-face positions, and heat-sealing the edge portions of the aligned packaging materials. Alternatively, the container may be obtained by folding back a single packaging material so that surfaces are aligned and overlapped with each other, and similarly heat-sealing the edge portions of the packaging material. Secondary batteries include, for example, lithium ion batteries, nickel hydrogen batteries, and lead batteries.

Leads 58 are sandwiched and sealed by the packaging material forming the container in which the heat-sealing resin layer 8 is on the inside. The leads 58 may be sandwiched by the packaging material via a tab sealant.

[Method of Manufacture of the Secondary Battery]

The following description addresses a method of manufacturing a secondary battery using the packaging material. The following description is provided by way of an example of manufacturing a secondary battery 60 using an embossed packaging material 50. FIGS. 4A-4D are a set of diagrams showing the embossed packaging material 50. FIGS. 4A, 4B, 4C, and 4D are perspective views illustrating manufacturing processing steps of a single-sided battery using the packaging material described above. The secondary battery 60 may be a double-sided battery manufactured by providing two packaging materials like the embossed packaging material 50, and bonding these packaging materials while they are aligned.

The secondary battery 60, that is, a single-sided battery can be manufactured, for example, through the following steps S1 to S5.

Step S1 of preparing a packaging material (e.g., the packaging material 10, 20 or 30), battery elements 56 including electrodes, and the leads 58 extending from the respective electrodes.

Figure 4A:
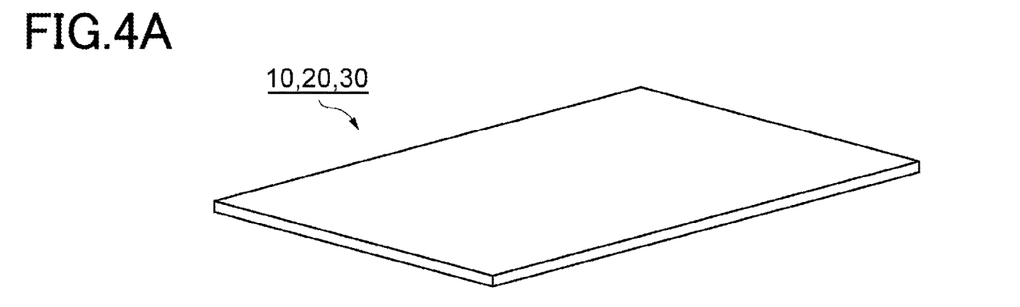
Figure 4B:
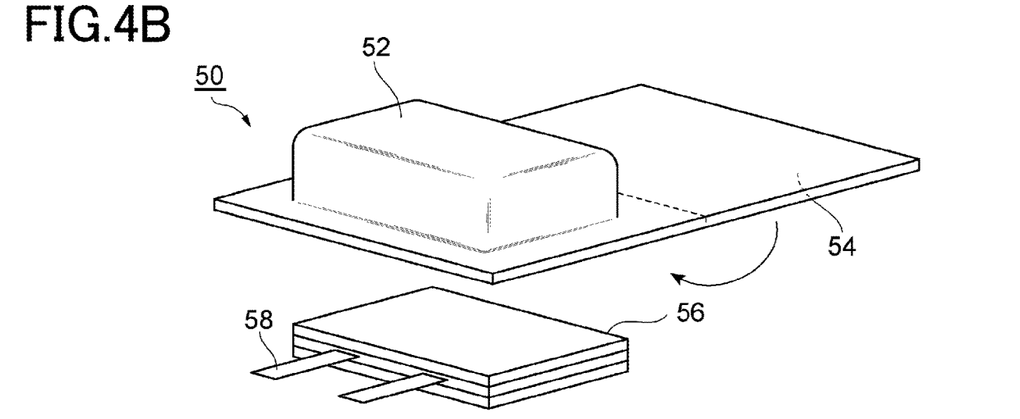
FIG. 4B shows the secondary battery packaging material that has been embossed, and battery elements.

Step S2 of forming a recess 52 in one half of the packaging material for arranging the battery elements 56 (see FIGS. 4A and 4B).

Figure 4C:
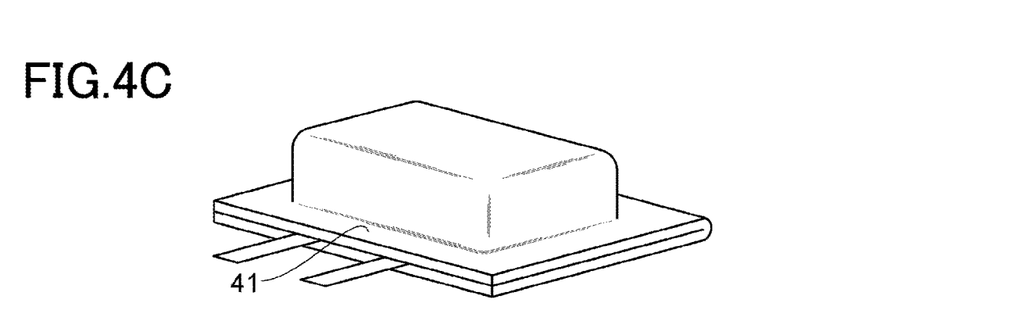
FIG. 4C shows the secondary battery packaging material, with a part thereof being folded back and the end portions being fused.

Step S3 of arranging the battery elements 56 in the area shaped by molding (recess 52) of the embossed packaging material 50, folding back the embossed packaging material 50 so that surfaces are aligned and overlapped with each other, with the recess 52 being covered by a cover 54, and pressure/heat sealing one side of the embossed packaging material 50 so as to sandwich the leads 58 extending from the battery elements 56 (see FIGS. 4B and 4C).

Step S4 of pressure/heat sealing the rest of the sides, except for the side where the leads 58 are going to be sandwiched, injecting an electrolyte solution from the unsealed side, and pressure/heat sealing the unsealed side in a vacuum (see FIG. 4C).

Figure 4D:
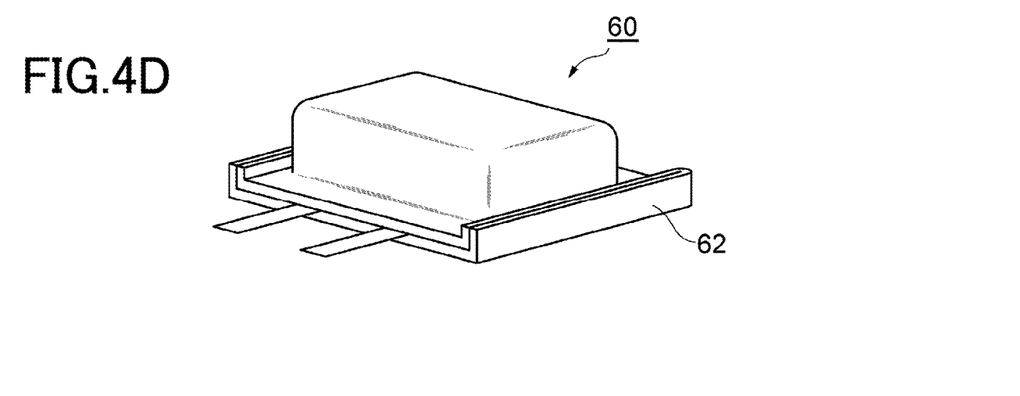
FIG. 4D shows the folded secondary battery packaging material, with both sides thereof being turned up.

Step S5 of trimming the end portions of the pressure/heat-sealed sides except the side where the leads 58 are sandwiched, and turning up the end portions towards the area shaped by molding (recess 52) (see FIG. 4D).

(Step S1)

In step S1, the packaging material, the battery elements 56 including electrodes, and the leads 58 extending from the electrodes are prepared. The packaging material is prepared based on the foregoing embodiment. The battery elements 56 and the leads 58 are not limited specifically. Known battery elements and leads can be used for the battery elements 56 and the leads 58.

(Step S2)

In step S2, the recess 52 for arranging the battery element 56 is formed on the heat-sealing resin layer 8 side of the packaging material. The method of forming the recess 52 includes molding (deep drawing) using a die. Molding includes a method of using a negative die and a positive die which are arranged forming a gap therebetween that is not less than the thickness of the packaging material. In the method, the positive die is pushed into the negative die together with the packaging material. The positive die pressure is adjusted to control the depth of the recess 52 (the degree of deep drawing) as desired. By forming the recess 52 in the packaging material, the embossed packaging material 50 is obtained.

(Step S3)

In step S3, the battery elements 56 including a positive electrode, a separator, a negative electrode, and other elements are arranged in the molding area (recess 52) of the embossed packaging material 50. The leads 58 extending from the battery elements 56 and respectively joined to the positive and negative electrodes are drawn from the molding area (recess 52) to the outside. After that, the embossed packaging material 50 is folded back at substantially the center thereof in the longitudinal direction, such that surfaces are aligned and overlapped with each other, with the heat-sealing resin layer 8 being on the inside, followed by pressure/heat-sealing one side of the embossed packaging material 50 sandwiching the leads 58. Pressure/heat sealing is controlled based on three conditions of temperature, pressure, and time, which are appropriately determined. Preferably, the temperature for pressure/heat-sealing is not less than the temperature at which the heat-sealing resin layer 8 is fused (melting point), but less than the temperature at which the second base material layer 6 is fused (melting point). When pressure/heat sealing is performed in that temperature range, the heat-sealing resin layer 8 is sufficiently fused, and the thickness is retained without fusing the second base material layer 6. Accordingly, heat sealing properties and insulation properties are both satisfied.

The thickness of the heat-sealing resin layer 8 before being heat-sealed is preferably in the range of 40% or more to 80% or less of the thickness of the lead 58. When the thickness of the heat-sealing resin layer 8 is not less than the lower limit, the end portions of the leads 58 are likely to be sufficiently filled with the heat-sealing resin, and when being not more than the upper limit, the thickness of the end portions of the packaging material in the secondary battery 60 is properly reduced. Thus, the amount of moisture penetrating from the end portions of the packaging material 10, 20 or 30 can be reduced.

(Step S4)

In step S4, the rest of the sides, except for the side where the leads 58 are going to be sandwiched, are pressure/heat-sealed. After that, an electrolyte solution is injected from the side left unsealed, followed by pressure/heat-sealing in a vacuum. Conditions for pressure/heat sealing are similar to Step S3.

(Step S5)

The peripheral end portions of the pressure/heat-sealed sides other than the side where the leads 58 are sandwiched are trimmed to remove the heat-sealing resin layer 8 extending off the end portions. After that, the peripheral end portions of the pressure/heat-sealed sides are turned up towards the molding area 52 side to form turned-up portions 62, thereby obtaining the secondary battery 60.

EXAMPLES

In the following, the present invention will be specifically described through Examples. However, the present invention is not limited to these Examples.

[Materials to be Used]

The following are materials used for forming the first base material layer, the first adhesive layer, the metal foil layer, the anti-corrosion treatment layer, the second adhesive layer, the second base material layer, the adhesive resin layer, and the heat-sealing resin layer of the packaging materials according to the Examples and Comparative Examples.

(First Base Material Layer)

First base material A-1: Polyamide resin film (Thickness: 15 µm).

First base material A-2: Mixture of polyamide resin having amino group and isocyanate curing agent.

First base material A-3: Mixture of polyester resin having hydroxyl group and isocyanate curing agent.

First base material A-4: Mixture of polyurethane resin having hydroxyl group and isocyanate curing agent.

First base material A-5: Mixture of polyamide-imide resin having carboxy group and epoxy curing agent.

(First Adhesive Layer)

First adhesive B-1: Polyester-urethane dual-liquid cure adhesive ([NCO/OH]=5).

(Metal Foil Layer)

Metal foil C-1: Annealed soft aluminum foil 8079 (Thickness: 40 µm).

(Anti-Corrosion Treatment Layer)

Treatment agent D-1: Coating type ceria sol treatment agent including ceric oxide, phosphoric acid, and acrylic resin as principle components.

(Second Adhesive Layer)

Second adhesive E-1: Polyester-urethane dual-liquid cure adhesive (Second Base Material Layer)

Second base material F-1: Mixture of polyester resin having hydroxyl group and isocyanate curing agent (Melting point of cured resin film (second base material layer): 230° C.)

Second base material F-2: Mixture of polyurethane resin having a hydroxyl group and isocyanate curing agent (Melting point of cured resin film: 250° C.)

Second base material F-3: Mixture of polyamide-imide resin having carboxy group and epoxy curing agent (Melting point of cured resin film: 290° C.)

Second base material F-4: Mixture of polyester resin having hydroxyl group and isocyanate curing agent (Melting point of cured resin film: 200° C.)

Second base material F-5: Polypropylene resin film (Thickness: 10 µm; Melting point: 160° C.)

Second base material F-6: Polyester resin film (Thickness: 25 µm; Melting point: 240° C.)

Second base material F-7: Mixture of polyester resin having hydroxyl group and isocyanate curing agent (Melting point of cured resin film: 190° C.)

(Adhesive Resin Layer)

Adhesive resin G-1: Maleic anhydride modified polypropylene resin (Trade name: Admer, manufactured by Mitsui Chemicals, Inc.)

(Heat-Sealing Resin Layer)

Heat sealing resin H-1: Unstretched polypropylene film (Thickness: 40 µm; Melting point: 160° C.)

Preparation of the Packaging Material

Example 1

The treatment agent D-1 was applied to a surface of the metal foil C-1, followed by baking to form an anti-corrosion treatment layer having a dry thickness of 100 nm. Subsequently, the first adhesive B-1 was applied to the surface on a side opposite to the surface on which the anti-corrosion treatment layer of metal foil C-1 was formed, so as to have a dry thickness of 4 µm, followed by bonding the first base material A-1 using a dry lamination method at 40° C. The resultant laminate was aged at 40° C. for 7 days. Subsequently, the second base material F-1 was applied to the anti-corrosion treatment layer side surface of the aged laminate so as to have a dry thickness of 8 µm. After that, the laminate was aged at 40° C. for 7 days for cross-linkage of the curing agent in the second base material. Subsequently, the second base material F-1 was applied to the surface, where the adhesive resin G-1 had already been applied, so as to have a dry thickness of 3 µm, followed by bonding the heat sealing resin H-1 using a dry lamination method at 100° C., thereby preparing a packaging material.

Example 2

The treatment agent D-1 was applied to a surface of the metal foil C-1, followed by baking to form an anti-corrosion treatment layer having a dry thickness of 100 nm. Subsequently, the first base material A-2 was applied to the surface on a side opposite to the surface, on which the anti-corrosion treatment layer of the metal foil C-1 was formed, so as to have a dry thickness of 8 µm. Subsequently, the second base material F-1 was applied to the anti-corrosion treatment layer, so as to have a dry thickness of 8 µm. The resultant object was then aged at 40° C. for 7 days, for cross-linkage of the curing agent in the second base material. Subsequently, the adhesive resin G-1 was applied to the surface, where the second base material F-1 had already been applied, so as to have a dry thickness of 3 µm, followed by bonding the heat sealing resin H-1 using a dry lamination method at 100° C., thereby preparing a packaging material was prepared.

Example 3

Except that the first base material A-3 was used instead of the first base material A-2, a packaging material was prepared similarly to Example 2.

Example 4

Except that the first base material A-4 was used instead of the first base material A-2, and the second base material F-2 was used instead of the second base material F-1, a packaging material was prepared similarly to Example 2.

Example 5

Except that the first base material A-5 was used instead of first base material A-2, and the second base material F-3 was used instead of second base material F-1, a packaging material was prepared similarly to Example 2.

Example 6

Except that the second base material F-4 was used instead of the second base material F-1, a packaging material was prepared similarly to Example 3.

Example 7

Except that the second base material F-7 was used instead of second base material F-1, a packaging material was prepared similarly to Example 3.

Comparative Example 1

The treatment agent D-1 was applied to a surface of the metal foil C-1, followed by baking to form an anti-corrosion treatment layer having a dry thickness of 100 nm. Subsequently, the first adhesive B-1 was applied to the surface on a side opposite to the surface on which the anti-corrosion treatment layer of metal foil C-1, so as to have a dry thickness of 4 μm, followed by bonding the first base material A-1 using a dry lamination method at 40° C. Subsequently, the second adhesive E-1 was applied to the anti-corrosion treatment layer so as to have a dry thickness of 4 μm, followed by bonding the second base material F-5 using a dry lamination method at 40° C. After that, the resultant object was aged at 40° C. for 7 days. Subsequently, the adhesive resin G-1 was applied to the second base material F-5 so as to have a dry thickness of 3 μm, followed by bonding the heat sealing resin H-1 using a dry lamination method at 100° C., thereby preparing a packaging material.

Comparative Example 2

The treatment agent D-1 was applied to a surface of the metal foil C-1, followed by baking to form and an anti-corrosion treatment layer having a dry thickness of 100 nm. Subsequently, the first adhesive B-1 was applied to the surface on a side opposite to the surface on which the anti-corrosion treatment layer of the metal foil C-1 was formed, so as to have a dry thickness of 4 μm, followed by bonding the first base material A-1 using a dry lamination method at 40° C. After that, the obtained laminate was aged at 40° C. for 7 days. Subsequently, the adhesive resin G-1 was applied to the anti-corrosion treatment layer side surface of the aged laminate, so as to have a dry thickness of 3 μm, followed by bonding the heat sealing resin H-1 using a dry lamination method at 100° C., thereby preparing a packaging material was prepared.

Comparative Example 3

The treatment agent D-1 was applied to a surface of the metal foil C-1, followed by baking to form an anti-corrosion treatment layer having a dry thickness of 100 nm. Subsequently, second base material F-1 was applied to the anti-corrosion treatment layer, so as to have a dry thickness of 8 μm. After that, the resultant object was aged at 40° C. for 7 days, for cross-linkage of the curing agent in the second base material layer. Subsequently, the adhesive resin G-1 was applied to the surface, where the second base material F-1 had already been applied, so as to have a dry thickness of 3 μm, followed by bonding the heat sealing resin H-1 using a dry lamination method at 100° C., thereby preparing a packaging material.

Comparative Example 4

Except that the second base material F-6 was used instead of the second base material F-5, a packaging material was prepared similarly to Comparative Example 1.

[Evaluation Method]
(Heat Resistance)

The packaging materials prepared in the Examples and the Comparative Examples were heated and pressurized at a temperature of 190° C. and a surface pressure of 0.5 MPa for 3 seconds, and a change in the shape of the second base material layer was visually observed. The cross section of the packaging material before and after heating and pressurization was observed using a microscope, and the thickness of the second base material layer before and after heating and pressurization was measured. Heat resistance was evaluated based on the following criteria. Comparative Example 2 was not evaluated because the second base material layer was not provided. Evaluations of heat resistance are shown in Table 1.

Very good: No change in the shape of the second base material layer due to heat sealing was observed, and the change in thickness of the second base material layer before and after heating and pressurization was less than 10%.

Good: No change in the shape of the second base material layer due to heat sealing was observed, and the change in thickness of the second base material layer before and after heating and pressurization was 10% or more and less than 20%.

Fair: The change in shape of the second base material layer due to heat sealing was slightly observed, or the change in thickness of the second base material layer before and after heating and pressurization was 20% or more and less than 30%.

Poor: The change in shape of the second base material layer due to heat sealing was observed, or the change in thickness of the second base material layer before and after heating and pressurization was 30% or more.

(Molding Depth)

The packaging materials prepared in the Examples and the Comparative Examples were each cut into a size of 150 mm×190 mm, and the cut packaging material was placed in a molding device so that the heat-sealing resin layer was on top. The molding depth of the molding device was set between 1 and 10 mm in increments of 1 mm, and the packaging material was cold-molded under an environment of ambient temperature 23° C. and a dew-point temperature −35° C. to evaluate moldability at each molding depth, based on the following criteria. The punching die used had a rectangle cross section of 100 mm×150 mm, a punch radius (RP) of 0.75 mm in the bottom surface, and a punch corner radius (RCP) of 1.5 mm in the side surface. The die used had a die radius (RD) of 0.75 mm in the top surface of the opening. The clearance between the punching die and the die was 0.20 mm. Evaluations of molding depth are shown in Table 1.

Very good: Deep drawing with a molding depth of 6 mm or more was possible with no breakage or cracks caused.

Good: Deep drawing with a molding depth of 4 mm or more and less than 6 mm was possible with no breakage or cracks caused.

Poor: Breakage or cracks were caused in deep drawing with a molding depth of less than 4 mm.

(Insulation Properties)

The packaging materials prepared in the Examples and the Comparative Examples were each cut into a size of 240 mm×70 mm. The cut packaging material was folded back at the midpoint of the long sides so that surfaces of the heat-sealing resin layer were brought to face-to-face positions, and 3 mm-width folded-back edge portions of the two long sides were pressure/heat sealed at a temperature of 190° C. and a surface pressure of 0.5 MPa for 3 seconds. After that, 3 mg electrolyte solution was injected from the open short side. The electrolyte solution contained ethylene carbonate (EC), dimethylcarbonate (DMC), and diethyl carbonate (DEC), which were admixed at EC:DMC:DEC=1:1:1 (weight ratio), with moisture content being suppressed to 20 ppm or less. Subsequently, in the state in which aluminum metal terminals (thickness: 50 μm; width: 12 mm; and length: 50 mm) were sandwiched between the face-to-face surfaces of the short side, a 3 mm-width edge portion of the open side was pressure/heat sealed at a temperature of 190° C., and a surface pressure of 0.5 MPa for 3 seconds, thereby preparing an insulation evaluation sample with a size of 120 mm×70 mm. Occurrence or non-occurrence of short circuits between the metal terminals of the prepared insulation evaluation sample and the metal foil layer of the packaging material was confirmed using a tester, and insulation properties were evaluated based on the following criteria. Evaluations of insulation are shown in Table 1.

Good: Of 20 samples, none caused reduction in resistance or short circuits.

Fair: Of 20 samples, 1 or more samples slightly caused reduction in resistance but none caused short circuits.

Poor: Of 20 samples, 1 or more samples caused short circuits.

(Warpage after being Molded)

The packaging materials prepared in the Examples and the Comparative Examples were each cut into a 120 mm×260 mm blank, and the cut packaging material was placed in a molding device so that the heat-sealing resin layer was on top. Setting the molding depth to 3 mm, the packaging material was cold-molded under an environment of an ambient temperature 23° C. and a dew-point temperature −35° C. The punching die used had a rectangle cross section of 70 mm×80 mm, a punch radius (RP) of 0.75 mm in the bottom surface, and a punch corner radius (RCP) of 1.5 mm in the side surface. The die used had a die radius (RD) of 0.75 mm in the top surface of the opening. The clearance between the punching die and the die was 0.20 mm. Molding area was set to substantially the center of one of the halves of the cut packaging material, the halves being defined by a line extending perpendicularly from substantially the center of the long side. The molding area was arranged so that three sides of the molding area were each located at positions 25 mm from both short sides and from one long side of the cut packaging material. With the heat-sealing resin layer on the bottom, the molded packaging material was allowed to stand under an environment of an ambient temperature 23° C. and a dew-point temperature −35° C. for 60 minutes, and the amount of warpage of the unmolded-area-side short side (distance from the short-side center to the surface stood still) was measured. Warpage was evaluated according to the following criteria. Evaluations of warpage after molding are shown in Table 1.

Very good: Amount of warpage was less than 50 mm.

Good: Amount of warpage was 50 mm or more and less than 100 mm.

Poor: Amount of warpage was 100 mm or more.

(Moisture Barrier Properties)

The packaging materials prepared in the Examples and the Comparative Examples were each cut into a size of 240 mm×70 mm. The cut packaging material was folded back at the midpoint of the long sides so that surfaces of the heat-sealing resin layer were brought to face-to-face positions, and 3 mm-width folded-back edge portions of the two long sides were pressure/heat sealed at a temperature of 190° C. and a surface pressure of 0.5 MPa for 3 seconds. After that, 3-mg electrolyte solution was injected from the open short side. The electrolyte solution contained ethylene carbonate (EC), dimethylcarbonate (DMC), and diethyl carbonate (DEC), which were admixed at EC:DMC:DEC=1:1:1 (weight ratio), with moisture content being suppressed to 20 ppm or less. Subsequently, a 3 mm-width edge portion of the open short side was pressure/heat sealed at a temperature of 190° C., and a surface pressure of 0.5 MPa for 3 seconds, thereby preparing a moisture penetration measurement sample in a size of 120 mm×70 mm. The prepared moisture penetration measurement sample was stored under an environment of a temperature of 60° C. and humidity 90% for 4 weeks. The moisture content in the stored electrolyte solution was measured using a Karl Fischer tester. Moisture contents of the Examples and the Comparative Examples were calculated, using the moisture content of Example 1 as a reference (100%). Moisture barrier properties were evaluated based on the following criteria. Evaluations of the moisture barrier properties are shown in Table 1.

Good: Moisture content was less than 110% relative to Example 1.

Poor: Moisture content was 110% or more relative to Example 1.

TABLE 1

|  | Heat resistance | Mold-ability | Insulation | Warpage after formed | Moisture barrier properties |
| --- | --- | --- | --- | --- | --- |
| Example 1 | Very good | Very good | Good | Good | Good |
| Example 2 | Very good | Very good | Good | Good | Good |
| Example 3 | Very good | Very good | Good | Very good | Good |
| Example 4 | Very good | Very good | Good | Very good | Good |
| Example 5 | Very good | Very good | Good | Very good | Good |
| Example 6 | Good | Very good | Good | Very good | Good |
| Example 7 | Fair | Good | Fair | Very good | Good |
| Comparative Example 1 | Poor | Good | Poor | Good | Good |
| Comparative Example 2 | — | Good | Poor | Poor | Good |
| Comparative Example 3 | Very good | — | Good | Poor | Good |
| Comparative Example 4 | Very good | Good | Good | Good | Poor |

In Examples 1 to 6 and Comparative Examples 3 and 4, very good heat resistance was obtained, whereas in Comparative Example 1, sufficient heat resistance was not obtained. In Comparative Example 1, since the second base material layer was not formed of a resin composite containing a thermosetting resin, it is considered that the shape was greatly deformed due to heat sealing. In Example 7, since the melting point of the second base material layer was low, although there was a slight change in the shape due to heat sealing, the degree of the change is determined to be in an allowable range.

In Examples 1 to 7 and Comparative Examples 1, 2, and 4, sufficient molding depth was obtained, whereas in Comparative Example 3, sufficient moldability was not obtained. Since the first base material layer was not provided in Comparative Example 3, it is considered that the metal foil layer was not protected.

In Examples 1 to 6 and Comparative Examples 3 and 4, very good insulation properties were obtained, whereas in Comparative Examples 1 and 2, sufficient insulation properties were not obtained. In Comparative Example 1, the second base material layer was not formed of a resin composite containing a thermosetting resin, and the inner layer of the metal foil layer became thin in heat sealing. Thus, from these facts, it is considered that the metal terminals were short-circuited with the metal foil layer. Comparative Example 2 was not provided with the second base material layer, and the inner layer of the metal foil layer became thin in heat sealing. Thus, from these facts, it is considered that the metal terminals were short-circuited with the metal foil layer. In Example 7, the melting point of the second base material layer was low, and the inner layer of the metal foil layer became slightly thin in heat sealing. Thus, from these facts, it is considered that, although the resistance was slightly lowered, the metal terminals were not short-circuited with the metal foil layer.

In Examples 1 to 7 and Comparative Examples 1 and 4, the amount of warpage was reduced, whereas in Comparative Example 2 and 3, the amount of warpage after molding was not sufficiently reduced. In Comparative Example 2 and 3, it is considered that since the base material layer was laminated on only one surface of the metal foil layer of the packaging material, warpage occurred after molding.

In Examples 1 to 7 and Comparative Examples 1 to 3, very good moisture barrier properties were obtained, whereas in Comparative Example 4, sufficient moisture barrier properties were not obtained. In Comparative Example 4, the second base material layer was thick and the second adhesive layer was further provided. It is considered from these facts that the amount of moisture penetrating from the end portions of the packaging material was increased. In the packaging material prepared similarly to Examples 1 to 7 except that the treatment agent D-1 was not applied to one surface of the metal foil C-1 (the anti-corrosion treatment layer was not formed), evaluations similar to the corresponding examples were obtained.

REFERENCE SIGNS LIST

1 . . . First base material layer
2 . . . First adhesive layer
3, 5 . . . Anti-corrosion treatment layer
4 . . . Metal foil layer
6 . . . Second base material layer
7 . . . Adhesive resin layer
8 . . . Heat-sealing resin layer
10, 20, 30 . . . (Secondary battery) packaging material
50 . . . Embossed packaging material
52 . . . Molded area (recess)
54 . . . Cover
56 . . . Battery element
58 . . . Lead (metal terminal)
60 . . . Secondary battery

What is claimed is:

1. A secondary battery packaging material having at least a metal foil layer, a second base material layer, and a heat-sealing resin layer laminated in this order on a first surface of a first base material layer, wherein:
the second base material layer is either laminated directly on the metal foil layer or laminated on an anti-corrosion treatment layer with the anti-corrosion treatment layer laminated directly on the metal foil layer;
the first base material layer is formed of a resin composite containing a thermosetting resin or a thermoplastic resin; and
the second base material layer is formed of a resin composite containing a thermosetting resin, wherein the second base material layer has a melting temperature higher than that of the heat-sealing resin layer by 40° C. or more.

2. The secondary battery packaging material of claim 1, wherein the metal foil layer is directly laminated on the first surface of the first base material layer.

3. The secondary battery packaging material of claim 1, wherein the first base material layer has a thickness in a range of 5 μm or more to 30 μm or less, and the second base material layer has a thickness in a range of 5 μm or more to 30 μm or less.

4. The secondary battery packaging material of claim 1, wherein difference in thickness between the first base material layer and the second base material layer is 15 μm or less.

5. The secondary battery packaging material of claim 1, wherein the first base material layer and the second base material layer are formed of the same resin material.

6. The secondary battery packaging material of claim 1, wherein the metal foil layer has a thickness in a range of 20 μm or more to 80 μm or less.

7. The secondary battery packaging material of claim 1, wherein a coating layer that contains a lubricant made of fatty amide is formed on a second surface of the first base material layer or on a surface of the heat-sealing resin layer.

8. A secondary battery comprising battery elements, and the secondary battery packaging material of claim 1.

9. The secondary battery packaging material of claim 1, wherein the second base material layer is laminated on an anti-corrosion treatment layer with the anti-corrosion treatment layer laminated directly on the metal foil layer.

10. The secondary battery packaging material of claim 1, wherein the second base material layer has a melting temperature higher than that of the heat-sealing resin layer by 70° C. or more.

11. The secondary battery packaging material of claim 9, wherein the second base material layer has a melting temperature higher than that of the heat-sealing resin layer by 70° C. or more.

12. The secondary battery packaging material of claim 1, wherein the second base material layer has the melting temperature of 200° C. or more.

13. The secondary battery packaging material of claim 1, wherein the second base material layer has the melting temperature of 230° C. or more.

14. The secondary battery packaging material of claim 9, wherein the second base material layer has the melting temperature of 200° C. or more.

15. The secondary battery packaging material of claim 9, wherein the second base material layer has the melting temperature of 230° C. or more.

16. The secondary battery packaging material of claim 1, wherein the thermosetting resin of the second base material layer is at least one resin selected from a group consisting of a polyester resin, a polyurethane resin, a polyamide resin, a polyimide resin, a fluorine resin, and a polyvinylidene chloride resin.

17. The secondary battery packaging material of claim 1, wherein the thermosetting resin of the second base material layer is at least one resin selected from a group consisting of a polyester resin, a polyurethane resin, and a polyamide-imide resin.

18. The secondary battery packaging material of claim 9, wherein the thermosetting resin of the second base material layer is at least one resin selected from a group consisting of a polyester resin, a polyurethane resin, a polyamide resin, a polyimide resin, a fluorine resin, and a polyvinylidene chloride resin.

19. The secondary battery packaging material of claim 9, wherein the thermosetting resin of the second base material layer is at least one resin selected from a group consisting of a polyester resin, a polyurethane resin, and a polyamide-imide resin.

* * * * *